United States Patent [19]

Bryant et al.

[11] Patent Number: 5,022,349

[45] Date of Patent: Jun. 11, 1991

[54] BIRD FEEDER TREE

[75] Inventors: William C. Bryant, Bell Arthur, N.C.; Robert K. Lowe, Hermitage, Tenn.

[73] Assignee: Empire Brushes, Inc., Greenville, N.C.

[21] Appl. No.: 495,431

[22] Filed: Mar. 19, 1990

[51] Int. Cl.⁵ ............................................. A01K 39/00
[52] U.S. Cl. ................................... 119/57.8; 248/156; 119/26
[58] Field of Search .................. 119/57.8, 57.9, 52.2, 119/52.3, 23, 26, 24, 25; D30/110, 111, 112, 124, 125, 127, 128; 248/156, 131, 132; 428/18, 19, 20

[56] References Cited

U.S. PATENT DOCUMENTS

| | | | |
|---|---|---|---|
| 3,101,291 | 8/1963 | Lalick | 428/18 X |
| 3,130,706 | 4/1964 | Myaida et al. | 119/23 |
| 3,606,222 | 9/1971 | Howard | 248/156 X |
| 3,646,911 | 3/1972 | Parson | 119/57.8 |
| 3,813,277 | 5/1974 | Kleiman | 428/20 X |
| 4,259,927 | 4/1981 | Clarke | 119/57.9 |
| 4,343,842 | 8/1982 | Chase | 428/20 X |
| 4,515,108 | 5/1985 | Rankin, Jr. | 119/23 |
| 4,548,804 | 10/1985 | Williamson | 428/18 X |
| 4,552,093 | 11/1985 | Puckett | 119/26 X |
| 4,829,934 | 5/1989 | Blasbalg | 119/57.8 |

FOREIGN PATENT DOCUMENTS 2130881  6/1984  United Kingdom .................. 428/18

OTHER PUBLICATIONS

"Homes for Birds", U.S. Dept. of Agr. Bulletin No. 1456, Jun. 6, 1934, p. 11.
Pure-Pak Advertisement, *Good Housekeeping*, Jun. 1971, p. 153.

*Primary Examiner*—Robert P. Swiatek
*Assistant Examiner*—Todd E. Manahan
*Attorney, Agent, or Firm*—Kirschstein, Ottinger, Israel & Schiffmiller

[57] ABSTRACT

A bird feeder tree includes an artificial tree trunk having an internal compartment in which bird feed is contained. Multiple feeding ports are provided on the trunk. Multiple artificial branches are mounted on the trunk adjacent the feeding ports. Birds perch on the branches and feed on the contained bird feed through the feeding ports.

20 Claims, 2 Drawing Sheets

BIRD FEEDER TREE

CROSS-REFERENCE TO RELATED APPLICATION

This application is related to pending U.S. design patent application Ser. No. D-123,654, filed Nov. 18, 1987, in which an ornamental design for a bird feeder tree was disclosed.

BACKGROUND OF THE INVENTION

1. Field of the Invention

This invention generally relates to bird feeders and, more particularly, to such feeders that realistically simulate the natural tree-like environment in which birds live and feed.

2. Description of Related Art

Numerous types of bird feeders of the kind exemplified, for example, by U.S. Pat. Nos. 4,414,922 and 4,829,934, have been developed over the years. The typical bird feeder includes a housing generally fashioned as a cylindrical tubular container. The housing has at least one feeding port therein. A rod-like perch extends outwardly of the housing beneath the feeding port. Birds rest on the perch and peck bird feed such as seeds through the feeding port.

Bird feeders have been mounted on many different types of supporting structures. They have been suspended on many different supporting structures. For example, they have been suspended from natural trees or other overhead supporting structures. They have also been supported from below by having been mounted on poles or like supporting structures mounted in the ground. They have also been mounted on window sills and held in place by windows of one's home.

Although the known bird feeders have been generally satisfactory for their intended purpose of attracting as many wild birds as possible into the view of a bird watcher, all the known bird feeders have been deficient in that they did not realistically simulate the natural tree-like, outdoor environment in which birds live and feed. The known cylindrical tubular containers did not resemble natural trees. The known rodlike perches with no leaves thereon did not resemble natural tree branches. In short, the known bird feeders did not satisfactorily attract as many birds as they could have if they more realistically simulated the natural tree-like, outdoor environment.

Also, the known bird feeders could only be positioned in certain predetermined locations where the aforementioned supporting structures were present. Thus, if there was no tree, support pole, window sill or the like nearby, the bird feeder could not be positioned in a remote location away from where the supporting structures were present. Moreover, there often were circumstances where the bird watcher wished to change the location of the bird feeder, but was constrained from doing so because of the unavailability of a supporting structure at the new location.

Still another drawback of known bird feeders was the difficulty in cleaning them of bird droppings, dirt, dust and other contaminants. The known bird feeders were essentially one-piece structures with their various parts not readily disassembleable to enable efficient and rapid cleaning of each part.

SUMMARY OF THE INVENTION

1. Objects of the Invention

It is a general object of this invention to realistically simulate the natural tree-like, outdoor environment in which birds live and feed.

It is another object of this invention to attract more birds to a bird feeder as compared to known bird feeders.

Another object of this invention is to increase the popularity of bird watching.

A further object of this invention is to enable a bird feeder to be positioned in virtually any desired location and be readily movable to another desired location.

Still another object of this invention is to easily clean a bird feeder.

Yet another object of this invention is to provide a bird feeder which is novel in design, inexpensive to manufacture, easily mass-produced, durable in construction, and weather-resistant.

2. Features of the Invention

In keeping with these objects, and others which will become apparent hereinafter, one feature of this invention resides, briefly stated, in a stand-alone bird feeder tree especially for outdoor use. The tree comprises an artificial tree trunk extending along a vertical trunk axis. The tree trunk has a tubular side wall bounding an internal bird feed compartment. A staking support structure is insertable into the ground at any desired location, and is operative for supporting the tree trunk in a generally upright orientation. The staking support structure is easily removable from the selected location and movable to any other desired location to permit the bird feeder tree to be located wherever desired.

Bird feed such as seeds is introduced into the compartment for containment therein. In a preferred embodiment, a filler cap is removably mounted over an upper open end region of the trunk to enable bird feed to be introduced into the compartment.

At least one feeding port, and preferably a plurality of equiangularly-arranged feeding ports, are provided on the trunk. Each feeding port extends radially from the compartment through the side wall to the exterior of the tree trunk. Each feeding port is large enough to permit the bird feed to pass therethrough.

The tree further comprises at least one artificial tree branch, and preferably a plurality of equiangularly-arranged artificial tree branches, removably mounted on the tree trunk. Each branch preferably has a stem with artificial leaves thereon. Each branch is mounted adjacent at least one of the feeding ports. When mounted, each tree branch extends generally outwardly of the tree trunk. Each branch is sufficiently rigid to support a bird perched on a respective tree branch and feeding on the contained bird feed through at least one feeding port associated with the respective tree branch.

In the preferred embodiment, the filler cap is formed with a mounting hole. The tree further comprises an artificial tree top branch having a stem with artificial leaves thereon. The stem has a mounting portion insertable in the mounting hole of the cap to support the tree top branch above the upper end region of the tree trunk. The aforementioned generally outwardly extending tree branches, also known as side branches, are mounted on the tree trunk with the aid of a plurality of branch holder rings. These rings are spaced apart of one another along, and are fixedly secured to, the tree trunk. Each ring has a plurality of mounting apertures in which the stems of the side branches are insertable and from which the side branches are removable. The tree top branch, together with the side branches, completes the natural tree simulation and, hence, is designed to attract more birds to the bird feeder tree, as compared to known bird feeders, to foster the entertainment value of bird watching.

In the preferred embodiment, the staking support structure includes a below-ground portion staked into the ground, and an above-ground portion around which the lower end region of the tree trunk is mounted. A pair of stabilizer collars is mounted on the above-ground portion. The collars are spaced apart of each other along, and are fixedly secured to, the above-ground portion. The collars extend radially outwardly of the above-ground portion, and supportably engage the side wall of the tree trunk, thereby reliably holding the tree trunk with the aforementioned branches in a generally upright orientation which is highly resistant to the forces of nature.

The easy removability of the tree top branch and of all the side branches from the tree trunk, as well as the easy removability of the tree trunk from the staking structure, together with the easy removability of the filler cap from the tree trunk, make for a readily assembleable and disassembleable bird feeder tree to permit fast and effective cleaning and transport from place to place.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
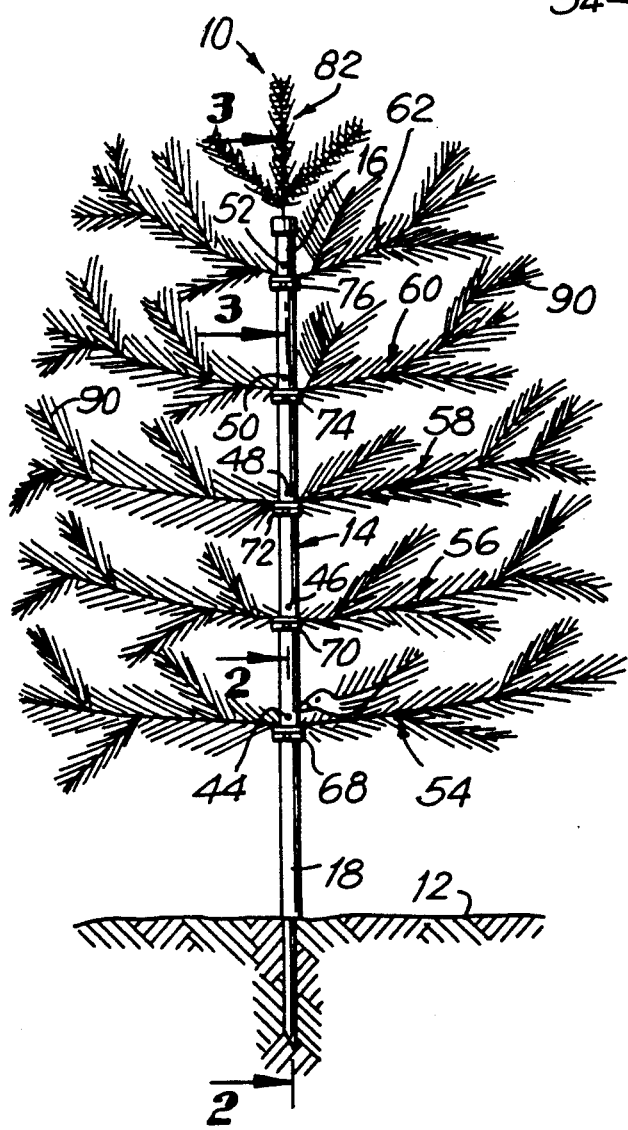
FIG. 1 is a front elevational view of a bird feeder tree mounted in the ground according to this invention.

Referring now to the drawings, reference numeral 10 generally identifies a stand-alone bird feeder tree mounted in the ground 12 for outdoor use. Tree 10 comprises an artificial tree trunk 14 extending along a trunk axis from an upper end region 16 to a lower end region 18. Trunk 14 has a tubular side wall of cylindrical shape. The side wall bounds an internal bird feed compartment 20. The trunk is preferably made of a rigid, synthetic plastic material which is weatherresistant, and is preferably extruded as a single tube of polyvinyl chloride. Other shapes for the trunk are also contemplated by this invention.

Figure 2:
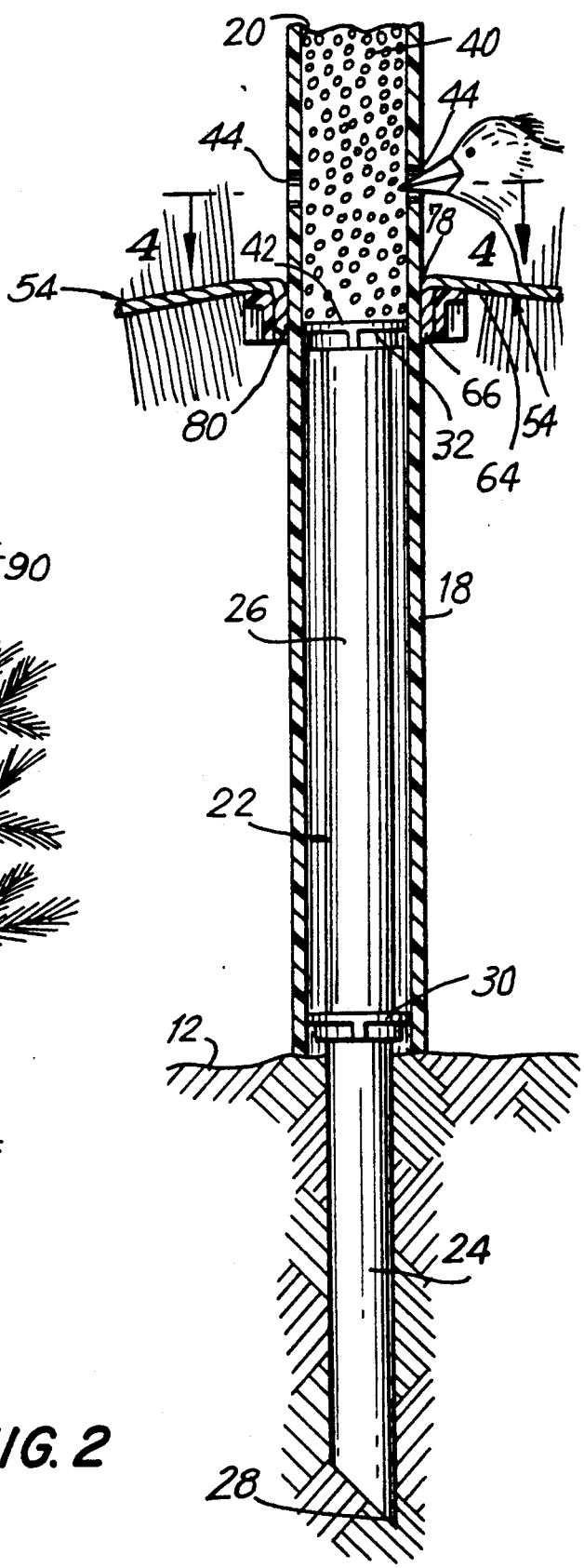
FIG. 2 is an enlarged sectional view taken on line 2—2 of FIG. 1.

As best shown in FIG. 2, the trunk 14 is supported in a generally upright vertical orientation by a stake 22 having a below-ground portion 24 and an aboveground portion 26. Portion 24 has a pointed lower end 28 to facilitate its penetration and placement in the ground 12. A pair of stabilizer collars 30, 32 is fixedly secured to the stake. Collars 30, 32 are spaced longitudinally apart of each other. The stake 22 is also extruded as a tube, and is preferably constituted of a synthetic plastic material such as polyvinyl chloride to resist weather. The collars 30, 32 are preferably glued to the stake.

In use, one pounds the pointed end 28 of the stake 22 into the ground until the lower collar 30 is positioned adjacent the ground. Thereupon, the lower end region 18 of the trunk 14 is fitted over the above-ground portion 26. The collars 30, 32 extend radially outwardly of the above-ground portion 26 and supportably engage the interior circumferential surface of the side wall of the trunk 14.

Figure 3:
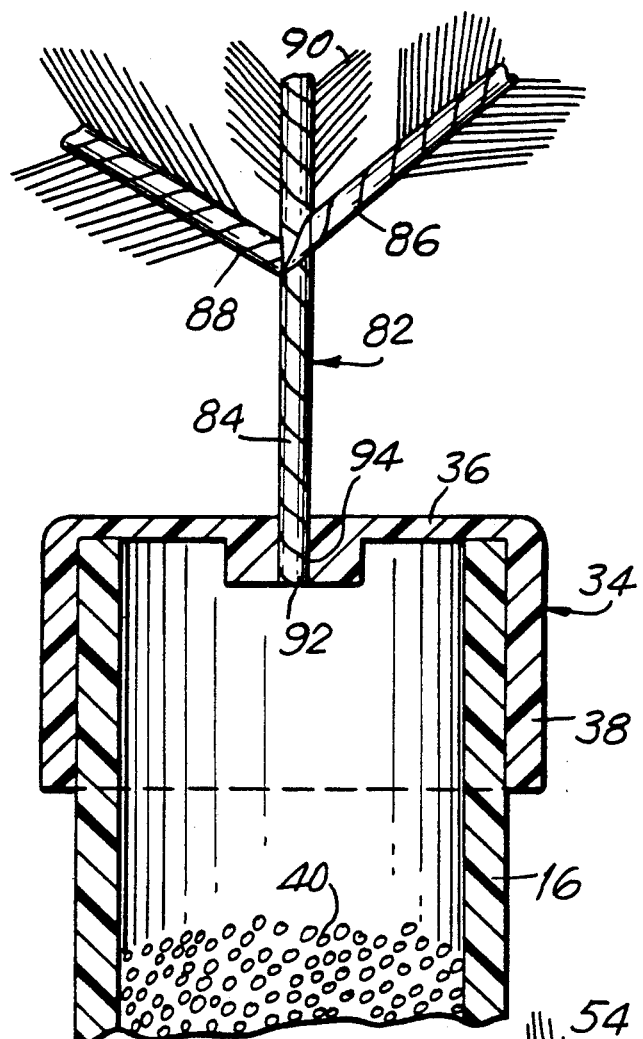
FIG. 3 is an enlarged sectional view taken on line 3—3 of FIG. 1.

As best shown in FIG. 3, a removable cap 34 is mounted on the upper end region 16 of the trunk. The cap 34 has a top wall 36 and a depending annular skirt 38. When the cap 34 is mounted over the open upper end region of the trunk, the top wall 36 closes this end. The skirt 38 frictionally engages the outer circumferential surface of the side wall of the trunk. When the cap 34 is removed from the trunk, bird feed, such as a multitude of seeds 40, is introduced into the compartment 20 for containment therein. As shown in FIG. 2, the upper surface 42 of the upper collar 32 forms a base wall on which the illustrated column of bird seed 40 is supported. Once the compartment has been filled with seed, the cap 34 is replaced, thereby closing the upper end region 16 of the trunk.

Figure 4:
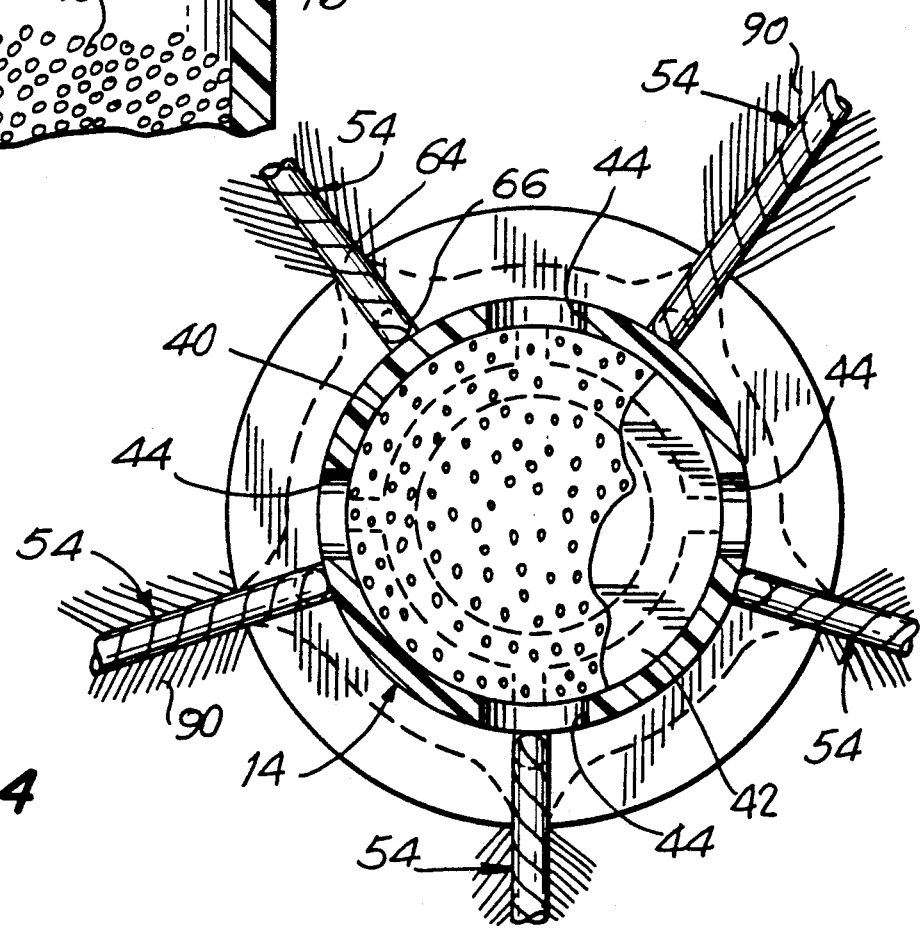
FIG. 4 is an enlarged sectional view taken on line 4—4 of FIG. 2.

Access to the seed by birds is achieved by providing at least one feeding port, and preferably a plurality of equiangularly-arranged feeding ports, on the trunk. As best shown in FIG. 4, a group of four feeding ports 44 are equiangularly arranged around the trunk axis at a first elevation relative to the ground 12. Additional groups of feeding ports 46, 48, 50, 52, as best shown in FIG. 1, are arranged along the trunk at successively higher elevations relative to the ground 12. Although this invention illustrates five groups of feeding ports, each group having four ports, it is not intended to be so limited, inasmuch as more or fewer groups could be provided, with each group having more or fewer feeding ports.

Each of the aforementioned feeding ports extends, as best shown in FIG. 2, radially from the compartment 20 through the side wall of the trunk to the exterior of the same. Each feeding port is dimensioned to enable at least the forward tip of a bird beak to pass therethrough with clearance and, of course, to allow the bird seed to be extracted from the compartment 20.

The feeding bird is supportably perched on at least one artificial tree side branch mounted on the tree trunk. In the preferred embodiment, a plurality of equiangularly-arranged side branches are mounted on the tree trunk adjacent the feeding ports. Each side branch extends generally outwardly radially and upwardly of the tree trunk.

As best shown in FIG. 4, a group of five such side branches 54 are mounted on the tree trunk at an elevation just below that of the feeding ports 44. Additional groups of side branches 56, 58, 60, 62 are arranged lengthwise of the trunk at successively higher elevations. The additional groups of side branches are also respectively mounted immediately below the groups of feeding ports 46, 48, 50, 52. Although the invention has been described and illustrated as having five groups of side branches, each group having five side branches, the invention is not intended to be so limited, since more or fewer groups of side branches, with each group having more or fewer than five branches, are contemplated.

As best shown in representative side branch 54 in FIGS. 2 and 4, each side branch has a main stem 64 and a bent mounting portion or hook 66. A plurality of branch holder rings 68, 70, 72, 74, 76, each associated with a respective group of side branches 54, 56, 58, 60, 62, are fixedly secured to the tree trunk at elevations below respective groups of feeding ports. The rings are fixedly secured to the tree trunk, preferably by using an adhesive. Each ring has a plurality of mounting apertures, each consisting of a generally radial channel 78 and a generally axial channel 80. Radial channel 78 receives a horizontal end region of the main stem 64; axial channel 80 receives the hook 66 and confines the latter against the exterior circumferential surface of the side wall of the trunk. The close confinement of the hook 66 within the axial channel 80 reliably supports each side branch in the aforementioned radially-outward and upward orientation.

Each side branch may have auxiliary stems which are offshoots of the main stem 64. Artificial leaves are provided on the main and auxiliary stems to simulate foliage. The term "leaves" is used herein in a generic sense to cover all types of plant outgrowths, and is specifically intended to cover broad, flat leaves, needle-like leaves, as well as flowers.

To complete the simulation of a real tree, an artificial tree top branch 82 is mounted on and above the upper end region of the tree trunk. The tree top branch 82 includes a main stem 84, as well as auxiliary stems 86, 88 (see FIG. 3) with needle-like leaves 90 thereon. The main stem 84 has an inner mounting portion 92 receivable with an interference fit in a mounting hole 94 provided in the top wall 36 of the cap 34.

Each of the side and tree top branches may advantageously be fabricated entirely of synthetic plastic material. Alternatively, the stems may be fabricated of a metal material, and the leaves of a plastic material. Other materials are, of course, contemplated by this invention.

After the stake 22 has been pounded into the ground, the tree trunk 14 is mounted over the above-ground portion 26. Thereupon, the side branches are mounted on the branch holder rings. With the filler cap 34 removed, the interior compartment 20 is filled with seed 40. The placement of the cap 34 with the tree top branch 82 thereon completes the assembly.

Thereupon, a bird watcher may view wild birds perched on the tree-like side branches and feeding on the seed 40 through the feeding ports. Many birds can be accommodated due to the multiplicity of branches and feeding ports. The easy removability of all of the component parts of the assembly, and particularly the removability of the side branches, enables the components to be readily cleaned and, if desired, moved from one location to another.

Even when the bird feeder tree has dispensed all its seeds, it still finds use as an ornamental outdoor landscaping accessory. If the tree is an evergreen, as illustrated, it finds particular utility as an outdoor accessory during the Christmas season.

It will be understood that each of the elements described above, or two or more together, also may find a useful application in other types of constructions differing from the types described above.

While the invention has been illustrated and described as embodied in a bird feeder tree, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A bird feeder tree, comprising:
   (a) an artificial tree trunk extending along a trunk axis and having a tubular side wall bounding an internal bird feed compartment;
   (b) means for supporting the tree trunk in a generally upright orientation;
   (c) means for filling bird feed into the compartment for containment therein;
   (d) a plurality of feeding ports, each extending radially from the compartment through the side wall to the exterior of the tree trunk;
   (e) a plurality of artificial tree branches, each having a stem with artificial leaves thereon, each stem having a mounting portion; and
   (f) a plurality of branch holder rings spaced apart of one another along, and secured to and around, the tree trunk, each ring having a plurality of mounting apertures in which respective mounting portions of the respective stems are received to hold the branches generally radially outwardly of the tree trunk, each ring being positioned adjacent at least one of the feeding ports to support a bird perched on a tree branch held by a respective ring to feed on the contained bird feed through said at least one feeding port.

2. The bird feeder tree according to claim 1, wherein the supporting means includes an elongated stake having one end region staked into the ground, and an opposite end region extending above the ground; and wherein the tree trunk is mounted around the opposite end region of the stake.

3. The bird feeder tree according to claim 2, wherein the opposite end region of the stake is a cylinder having a predetermined diameter, and wherein the tree trunk is a cylinder having a larger diameter than said predetermined diameter; and wherein the supporting means further includes a pair of stabilizer collars spaced apart of each other along, and fixedly secured to, the opposite end region of the stake, each collar extending outwardly of the opposite end region of the stake and engaging the side wall of the tree trunk.

4. The bird feeder tree according to claim 3, wherein one of the collars has an upper wall that bounds a lower end of the compartment.

5. The bird feeder tree according to claim 1, wherein the filling means includes a removable cap mounted on an upper end region of the tree trunk for movement between an open position in which the cap is remote from the tree trunk and enables the bird feed to be admitted into the compartment, and a closed position in which the cap is mounted over, and closes, the upper end region of the tree trunk.

6. The bird feeder tree according to claim 5, wherein the cap has a mounting hole; and further comprising an artificial tree top branch having a stem with artificial leaves thereon, said stem having a mounting portion insertable in the mounting hole to support the tree top branch above the upper end region of the tree trunk.

7. The bird feeder tree according to claim 1, wherein the rings are fixedly secured to the tree trunk, and wherein each mounting portion is insertable in, and removable from, a respective mounting aperture.

8. The bird feeder tree according to claim 7, wherein each holder ring is mounted adjacent to, and below, a group of said feeding ports.

9. The bird feeder tree according to claim 8, wherein each stem is rod-shaped, and wherein each mounting portion is a bent rod hooked into a respective mounting aperture.

10. The bird feeder tree according to claim 8, wherein each stem has a rod-like perch adjacent a respective mounting portion, and on which perch the bird is supported.

11. The bird feeder tree according to claim 11, wherein the tree trunk is elongated along a vertical axis, and wherein the artificial tree branches extend generally upwardly of the tree trunk.

12. A stand-alone bird feeder tree for outdoor use, comprising:
  (a) an artificial tree trunk extending along a trunk axis and having a tubular side wall bounding an internal bird feed compartment;
  (b) staking means insertable at a selected location into the ground for supporting the tree trunk in a generally upright orientation;
  (c) means for filling bird feed into the compartment for containment therein;
  (d) a plurality of equiangularly-arranged feeding ports, each extending radially from the compartment through the side wall to the exterior of the tree trunk;
  (e) a plurality of equiangularly-arranged artificial tree branches, each having a stem with artificial leaves thereon, each stem having a mounting portion; and
  (f) a plurality of branch holder rings spaced apart of one another, and secured to and around the tree trunk, each ring having a plurality of mounting apertures in which respective mounting portions of respective stems are received to hold the branches generally radially outwardly of the tree trunk, each ring being positioned adjacent at least one of the feeding ports to support a bird perched on a respective tree branch held by a respective ring to feed on the contained bird feed through said at least one feeding port.

13. The bird feeder tree according to claim 12, wherein the staking means includes an elongated stake having one end region staked into the ground, and an opposite end region extending above the ground; and wherein the tree trunk is mounted around the opposite end region of the stake.

14. The bird feeder tree according to claim 12, wherein the opposite end region of the stake is a cylinder having a predetermined diameter, and wherein the tree trunk is a cylinder having a larger diameter than said predetermined diameter; and further comprising a pair of stabilizer collars spaced apart of each other along, and fixedly secured to, the opposite end region of the stake, each collar extending outwardly of the opposite end region of the stake and engaging the side wall of the tree trunk.

15. The bird feeder tree according to claim 12, wherein the filling means includes a removable cap mounted on an upper end region of the tree trunk for movement between an open position in which the cap is remote from the tree trunk and enables the bird feed to be admitted into the compartment, and a closed position in which the cap is mounted over, and closes, the upper end region of the tree trunk.

16. The bird feeder tree according to claim 15, wherein the cap has a mounting hole; and further comprising an artificial tree top branch having a stem with artificial leaves thereon, said stem having a mounting portion insertable in the mounting hole to support the tree top branch above the upper end region of the tree trunk.

17. The bird feeder according to claim 12, wherein the rings are fixedly secured to the tree trunk, and wherein each mounting portion is insertable in, and removable from, a respective mounting aperture.

18. The bird feeder tree according to claim 12, wherein the feeding ports are arranged in groups, and wherein each holder ring is mounted adjacent to, and below, a respective group of said feeding ports.

19. The bird feeder tree according to claim 18, wherein each stem is rod-shaped, and wherein each mounting portion is a bent rod hooked into a respective mounting aperture.

20. The bird feeder tree according to claim 18, wherein each stem has a rod-like perch adjacent a respective mounting portion, and on which perch the bird is supported.

* * * * *